Aug. 24, 1954 A. G. HUPP 2,687,075
CULTIVATOR ATTACHMENT
Filed Aug. 25, 1949 3 Sheets-Sheet 1

INVENTOR.
Arleigh G. Hupp.
BY
Andrus & Scealer
Attorneys

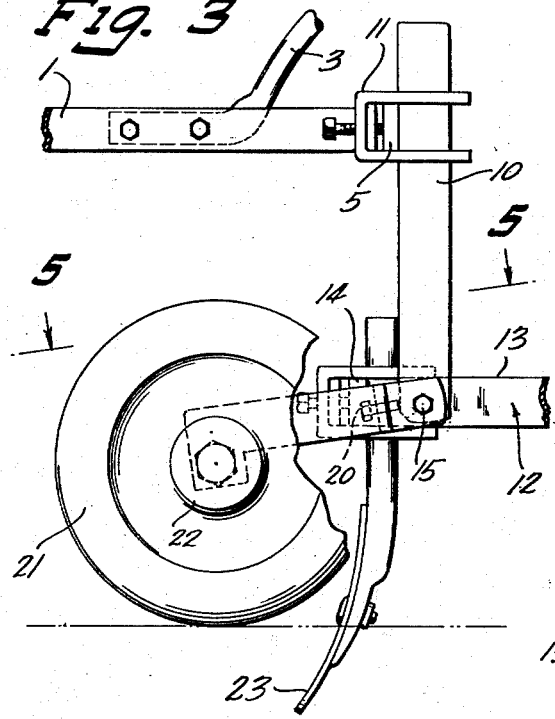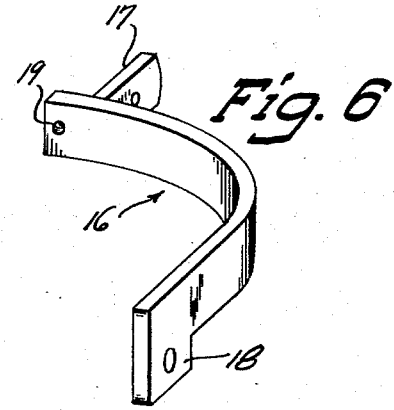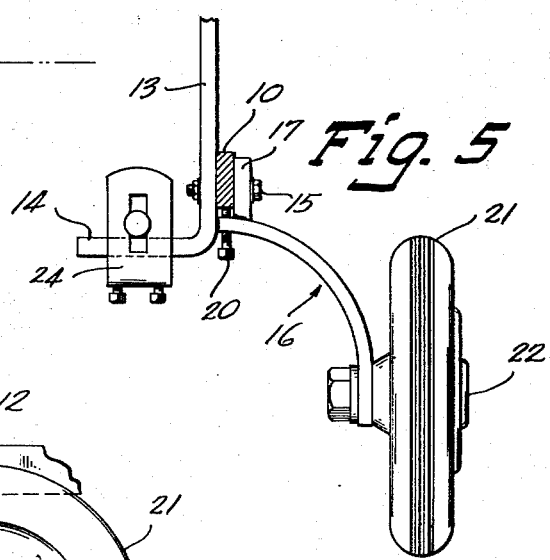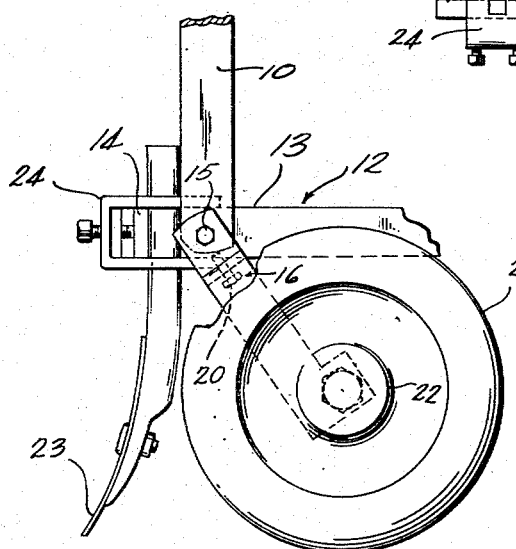

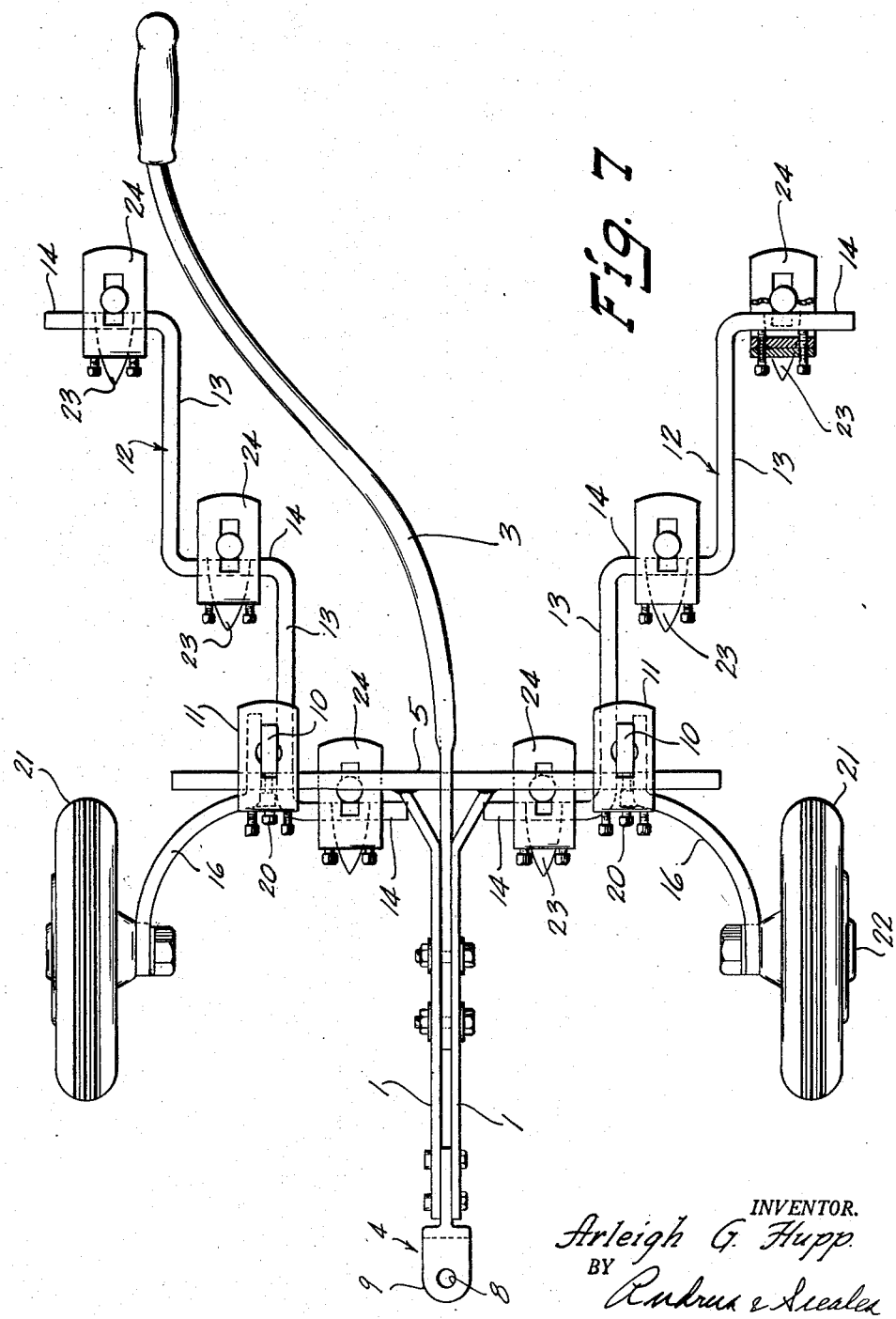

Patented Aug. 24, 1954

2,687,075

UNITED STATES PATENT OFFICE 2,687,075

CULTIVATOR ATTACHMENT

Arleigh Glynn Hupp, Milwaukee, Wis., assignor to The Midland Co., South Milwaukee, Wis., a corporation of Wisconsin Application August 25, 1949, Serial No. 112,253

3 Claims. (Cl. 97—165)

This invention relates to a cultivator attachment for use in connection with a power garden tractor or the like.

An object of the invention is to provide a cultivator attachment which may be quickly and easily shifted from transport position to cultivating or work position, and vice versa.

A further object is to provide a cultivator attachment which may be readily and simply adjusted for different working depths.

Another object is to provide a cultivator atachment having relatively few parts, which is of sturdy construction and which is free of complicated depth regulating means for the cultivator plows.

These and other objects will be more fully explained hereinafter.

In the drawing:

Fig. 3 is a side fragmentary view showing the relative positions of a wheel and cultivator shovel in cultivating position;

Fig. 4 is a view similar to Fig. 3 with the cultivator shovel in transport position;

Fig. 5 is a view taken on line 5—5 of Fig. 3;

Fig. 6 is a perspective view of the wheel bracket; and

Fig. 7 is a plan view of the cultivator attachment of the invention.

Figure 1:
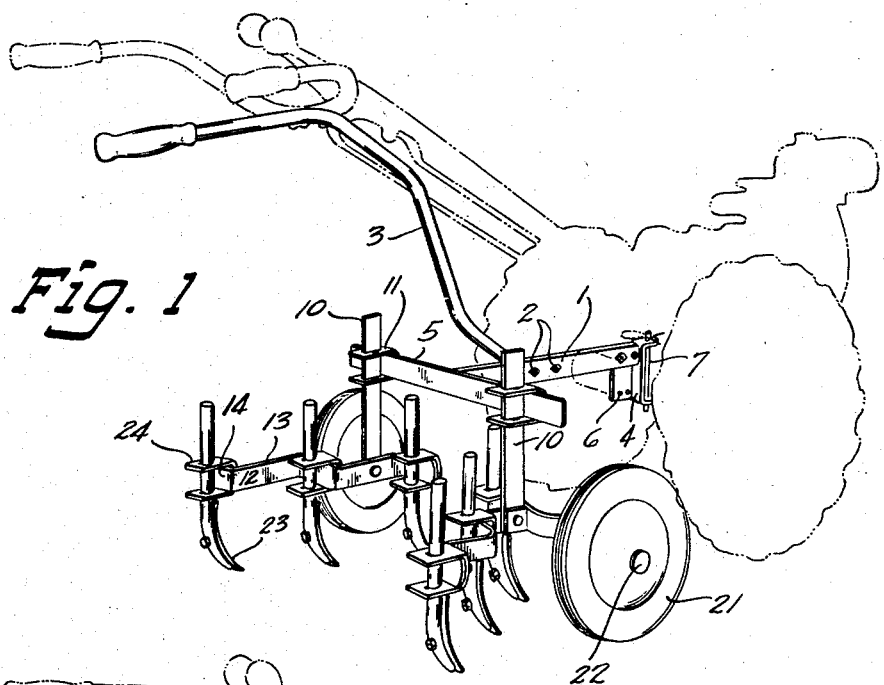
Figure 1 is a perspective view taken from the rear and showing the cultivator in working position and attached to a power tractor.
Figure 2:
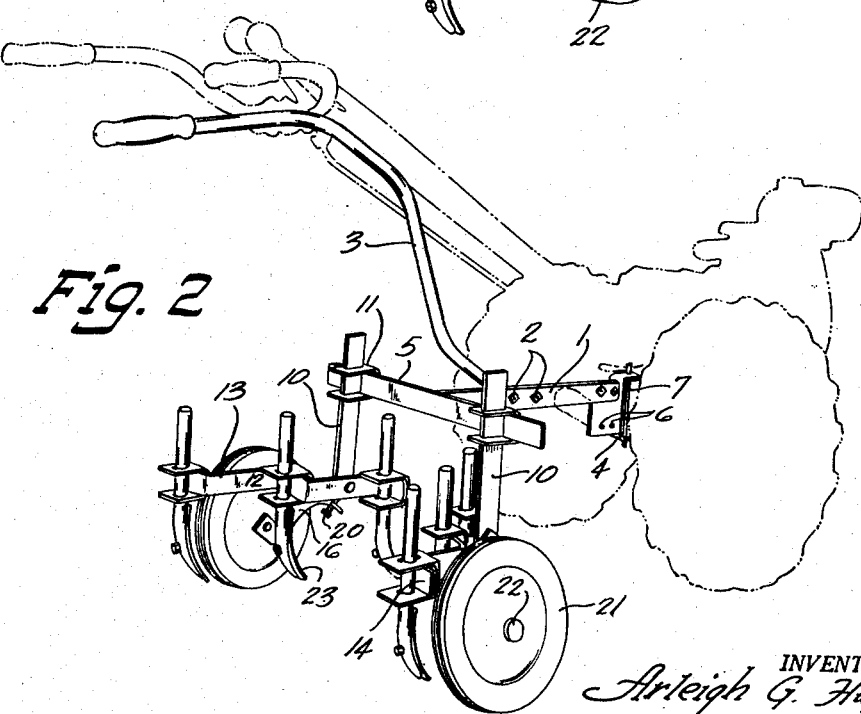
Fig. 2 is a view similar to Fig. 1 showing the attachment in transport position.

Briefly, the invention comprises a cultivator attachment in which the shovels or tools are mounted on a tool holding bar in staggered relationship to one another. The frame of the attachment is carried by a pair of rubber tired wheels connected to the frame by wheel carriages or brackets which are readily shifted about their pivot points to place the attachment in transport or working position without having to raise or lower the shovels or tools by a screw-down mechanism or the like.

The drawbar comprises horizontally disposed parallel members 1 provided with a plurality of apertures 2 therethrough for the reception of bolts to secure the handle 3 and a vertically disposed hitch 4 thereto.

At an end opposite to that to which hitch 4 is disposed, members 1 are bent outwardly in a general Y-formation and are secured to a crossbar 5. In general the entire drawbar is T-shaped.

Hitch 4 is provided witht a plurality of vertically aligned apertures 6 for the reception of bolts to secure the hitch to members 1. The hitch may be secured to a power tractor in any manner but for the purposes of illustrating this invention a pin 7 is inserted through aligned apertures 8 in horizontally disposed ears 9 of the hitch.

A pair of vertical frame members 10 are adjustably secured to cross-member 5 by means of U-shaped clip members 11. Stepped shovel or blade carrying members 12 are secured as by welding to the lower end of members 10. Members 12 are formed to provide a plurality of horizontally disposed leg members 13 and transversely disposed legs 14. Members 10 are secured to one of members 13 as shown in the drawing, as by welding.

Bolts 15 extend outwardly through the members 10 and 13 at their point of juncture.

Wheel carrying frame members comprising arcuate members 16 having apertured ears 17 and 18 disposed normally to one another and to members 16, at either end thereof, are pivotally secured to members 13 by disposing the apertured ears 17 on the bolts 15 and securing the same thereto by suitable nuts.

Threaded apertures 19 at one end of members 16 receive bolts 20 which act as stops against the front edge and lower edge of vertical members 10 as carriage members 16 pivot about bolts 15 to work or transport position.

Rubber tired wheels 21 are removably secured, for rotation, to ears 18 by means of bolts 22 extending through the wheels and ears and secured by nuts abutting the inner side of ears 18.

Cultivator shovels 23 are removably secured to each of the transversely disposed legs 14 of the shovel carrying members 12 by U-clips 24. It will be noted that the shovels may each be adjusted vertically through U-clips 24 or each group may be likewise adjusted as a unit through U-clips 11.

To put the cultivator attachment into a work position from transport position, it is only necessary to lift the attachment by the handle 3 and then kick the wheels 21 forwardly into the position shown in Figs. 1 and 3. The wheel brackets 16 will swing forwardly about their pivot points 15 until the bolts 20 abut the lower edge of members 10. The attachment is then lowered until the cultivator shovels rest on or in the ground.

If it is desired to place the unit into transport position the cultivator shovels are lifted clear of the ground by the handle 3 and the wheels 21 move rearwardly into transport position until the bolts 20 engage the rear edge of the corresponding members 10. The entire unit may be turned quite easily, as for instance at the end of a row that has been cultivated, by simply turning the same by handle 3 about the pivot pin which serves to attach the cultivator unit to the power unit.

It will be noted that the above described structure provides a relatively simple and sturdy cultivator attachment in which the cultivator shovels may be quickly and easily changed from work position to transport position and vice versa without the necessity of utilizing complicated raising and lowering mechanism such as is found in the prior art.

Various embodiments of the invention may be employed within the scope of the accompanying claims.

I claim:

1. A cultivator attachment for use with a mobile power unit comprising a horizontally disposed drawbar, a hitch secured at one end thereof, a handle secured to said drawbar, vertically disposed frame members secured to said drawbar and having horizontally disposed shovel carrying members rigidly secured at the lower ends thereof, horizontally disposed bolts extending through and secured to the frame members and the shovel carrying members at their points of juncture, wheel carrying members pivoted at one end about said bolts and having wheels rotatably mounted at the other end thereof, and vertically disposed cultivator shovels adjustably secured to said carrying members, said wheel carrying members being freely pivotal between stops selectively to either one of two positions, in one position of which the wheels determine the depth of cut for the shovels and in the other position of which the wheels support the shovels above the ground level for transport.

2. In a cultivator having a frame adapted to be hitched to a drawbar and to be raised and lowered relative to the ground, and a plurality of cultivator shovels carried by said frame, at least one wheel support for said frame comprising an arm, a wheel mounted upon the outer end of said arm, a horizontal pivotal connection between the arm and frame adapted to suspend the arm and wheel in free pivotal relation to the frame, and a stop disposed to limit the pivotal movement of the arm rearwardly just past the vertical dead center position whereby the wheel supports the shovels in raised position for forward transport, said arm being pivotally movable in a direction past the vertical dead center and away from said stop position to float said wheel relative to the frame whereby the cultivator shovels are permitted to enter the ground.

3. In a cultivator having a frame adapted to be hitched to a drawbar and to be raised and lowered relative to the ground, and a plurality of cultivator shovels carried by said frame, at least one wheel support for said frame comprising an arm, a wheel mounted upon the outer end of said arm, a horizontal pivotal connection between the arm and frame adapted to suspend the arm and wheel in free pivotal relation to the frame, a stop disposed to limit the pivotal movement of the arm rearwardly just past the vertical dead center position whereby the wheel supports the shovels in raised position for forward transport, said arm being pivotally movable in a direction past the vertically dead center and away from said stop position to float said wheel relative to the frame whereby the cultivator shovels are permitted to enter the ground, and an adjustable stop between said arm and frame to regulate the depth of cultivation when the wheel is in the non-transport position.

References Cited in the file of this patent

UNITED STATES PATENTS

| Number | Name | Date |
| --- | --- | --- |
| 351,357 | Carhart | Oct. 26, 1886 |
| 676,005 | Manes | June 11, 1901 |
| 701,950 | Shew | June 10, 1902 |
| 2,141,805 | White | Dec. 27, 1938 |
| 2,164,550 | Steward | July 4, 1939 |
| 2,330,283 | Hipple | Sept. 28, 1943 |
| 2,430,223 | Goode | Nov. 4, 1947 |
| 2,525,023 | Ensminger | Oct. 10, 1950 |